United States Patent [19]

Coward et al.

[11] 4,256,133

[45] Mar. 17, 1981

[54] WATERING VALVE DEVICE

[76] Inventors: Noel D. Coward, 3 Withers Ave., Mulgrave, Victoria; Donald G. Collins, 9 Frederick St., Bulleen, Victoria; Kenneth H. Gambling, Unit 3, 86 Graham Rd., Rosanna, Victoria, all of Australia

[21] Appl. No.: 936,567

[22] Filed: Aug. 22, 1978

[30] Foreign Application Priority Data

Aug. 22, 1977 [AU] Australia ............................. PD1327
Nov. 15, 1977 [AU] Australia ............................. PD2422
Dec. 5, 1977 [AU] Australia ............................. PD2663

[51] Int. Cl.³ ........................................... A01G 25/16
[52] U.S. Cl. ............................... 137/78.3; 137/624.11; 239/64; 251/137
[58] Field of Search ............ 236/63, 64; 250/214 AL; 137/78 R, 78 D, 78 A, 78 C; 73/73

[56] References Cited

U.S. PATENT DOCUMENTS

| | | | |
|---|---|---|---|
| 3,224,676 | 12/1965 | Rauchwerger | 137/78 |
| 3,361,356 | 1/1968 | Johnson et al. | 137/78 |
| 3,383,084 | 5/1968 | Mayfield | 251/137 X |
| 3,777,976 | 12/1973 | Milodvancevic | 137/78 |
| 3,991,939 | 11/1976 | Maclay | 239/63 |
| 4,180,087 | 12/1979 | Meisner et al. | 137/78 |
| 4,197,866 | 4/1980 | Neal | 239/63 X |

Primary Examiner—Gerald A. Michalsky
Assistant Examiner—Richard Gerard
Attorney, Agent, or Firm—Lowe, King, Price & Becker

[57] ABSTRACT

A watering valve device includes a first electromagnetic coil for opening a valve to enable a sprinkling system and a second electromagnetic coil for closing the valve. An electronic circuit is provided for supplying current pulses for selectively energizing the two coils to control sprinkling in response to ground moisture and/or sunlight. The circuit includes a first timer for maintaining the sprinkling valve on for a predetermined timer period after sunlight occurs to assure penetration of the ground by moisture during night-time watering. The circuit includes a second timer for maintaining the valve on for a second predetermined time period following moisture detection by a ground probe to assure ground penetration by moisture during a moisture responsive, closed loop mode of control. The circuit and valve are operated by batteries that are charged by sunlight.

8 Claims, 9 Drawing Figures

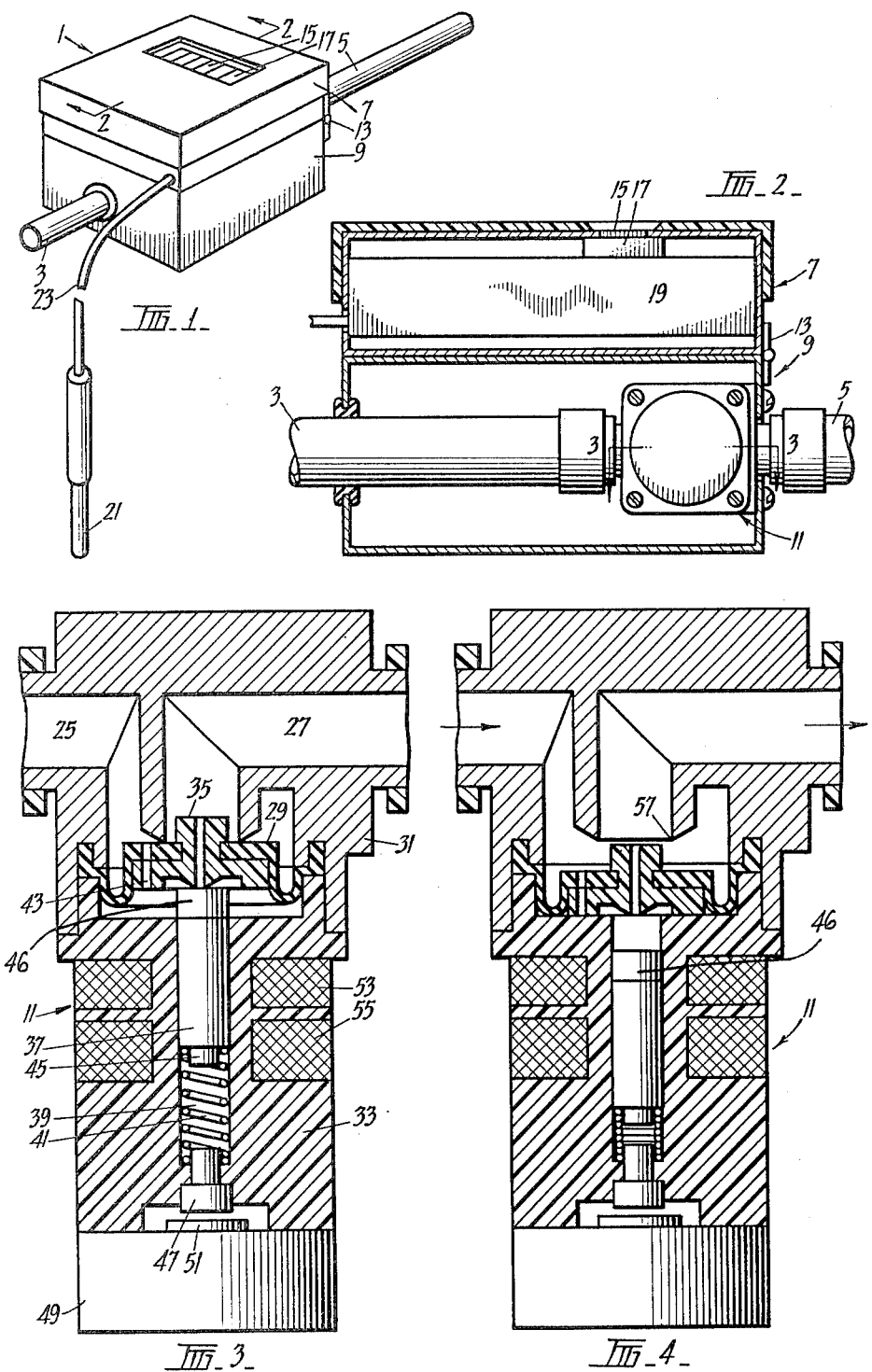

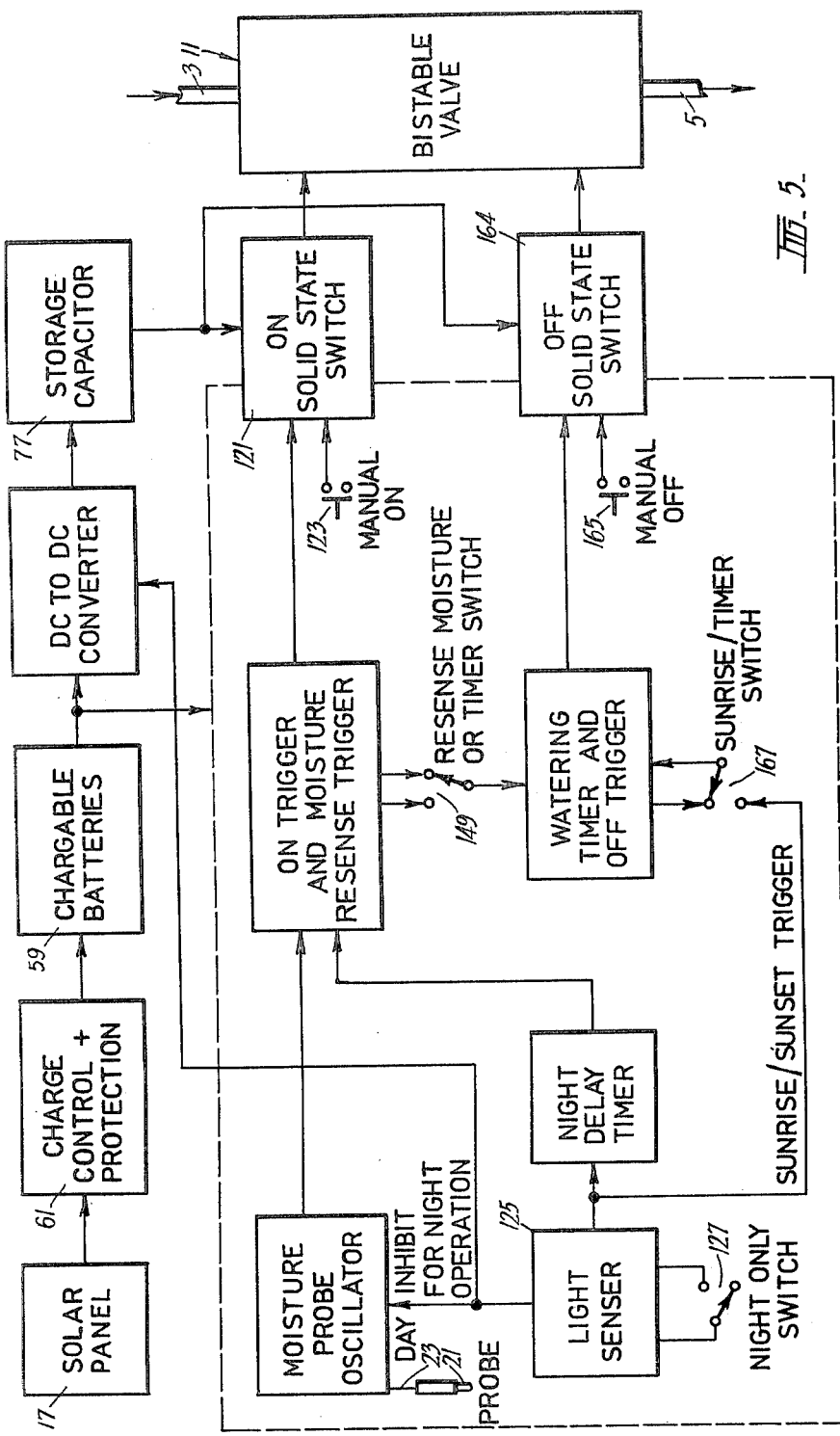

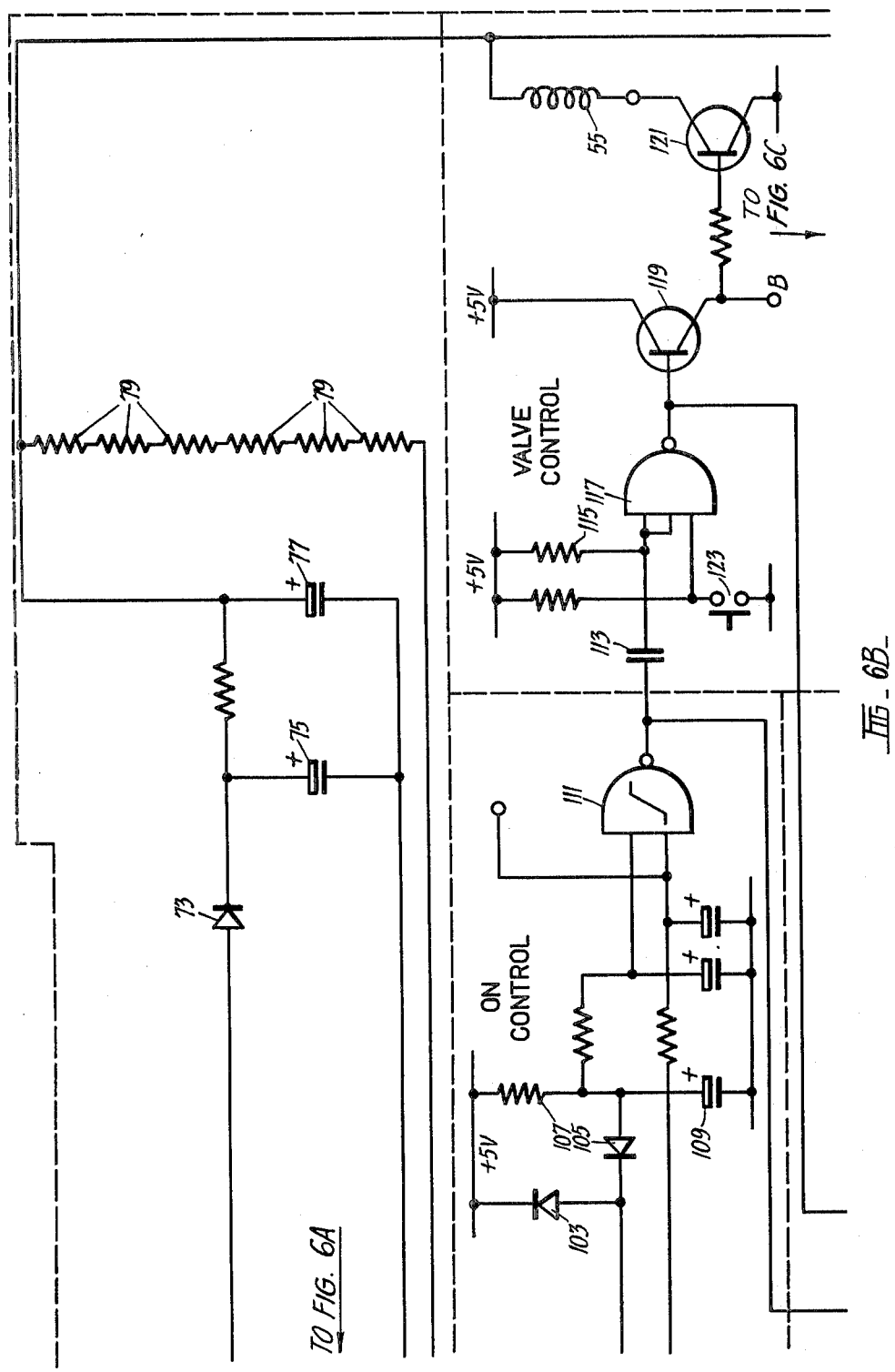

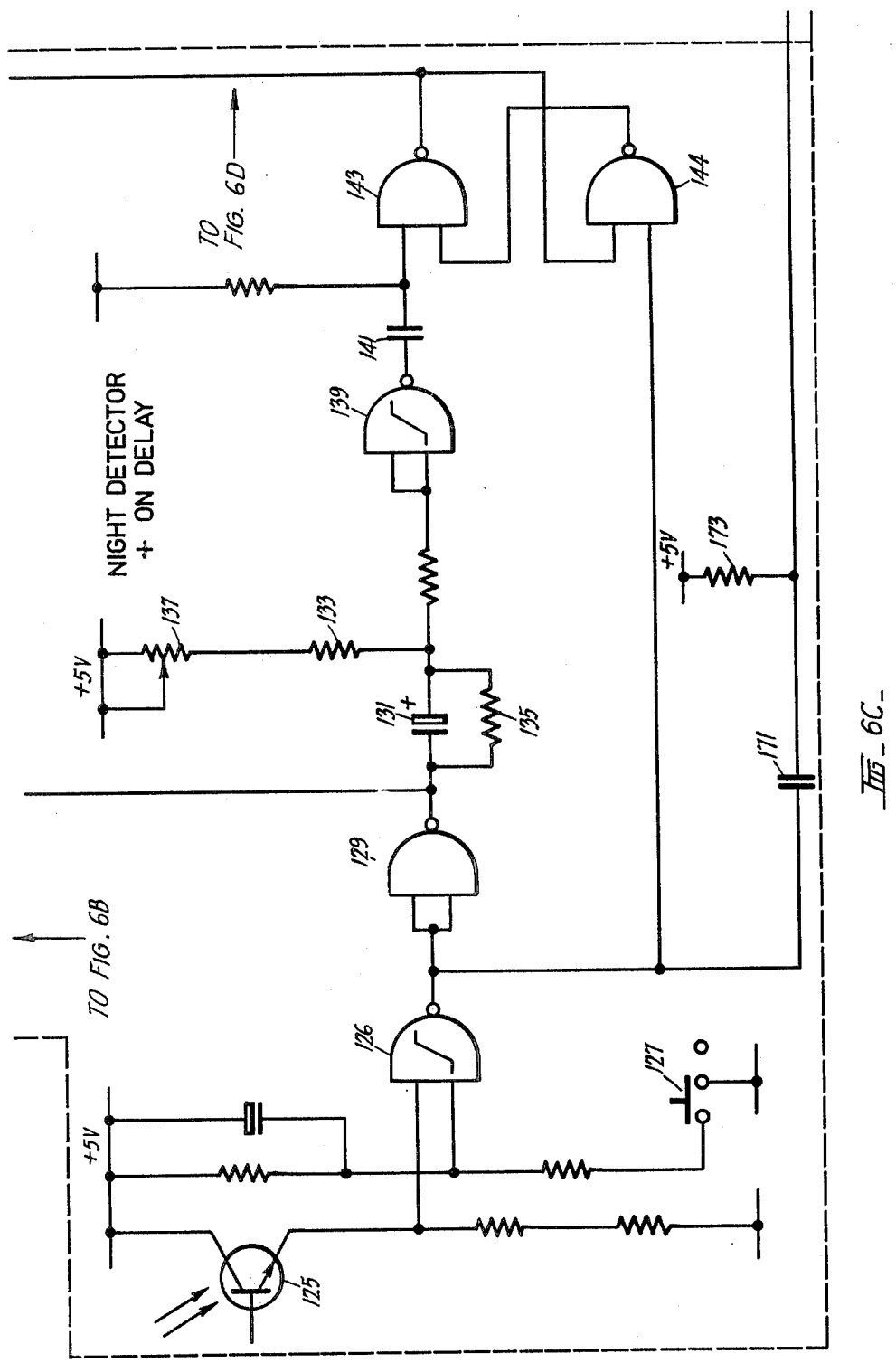

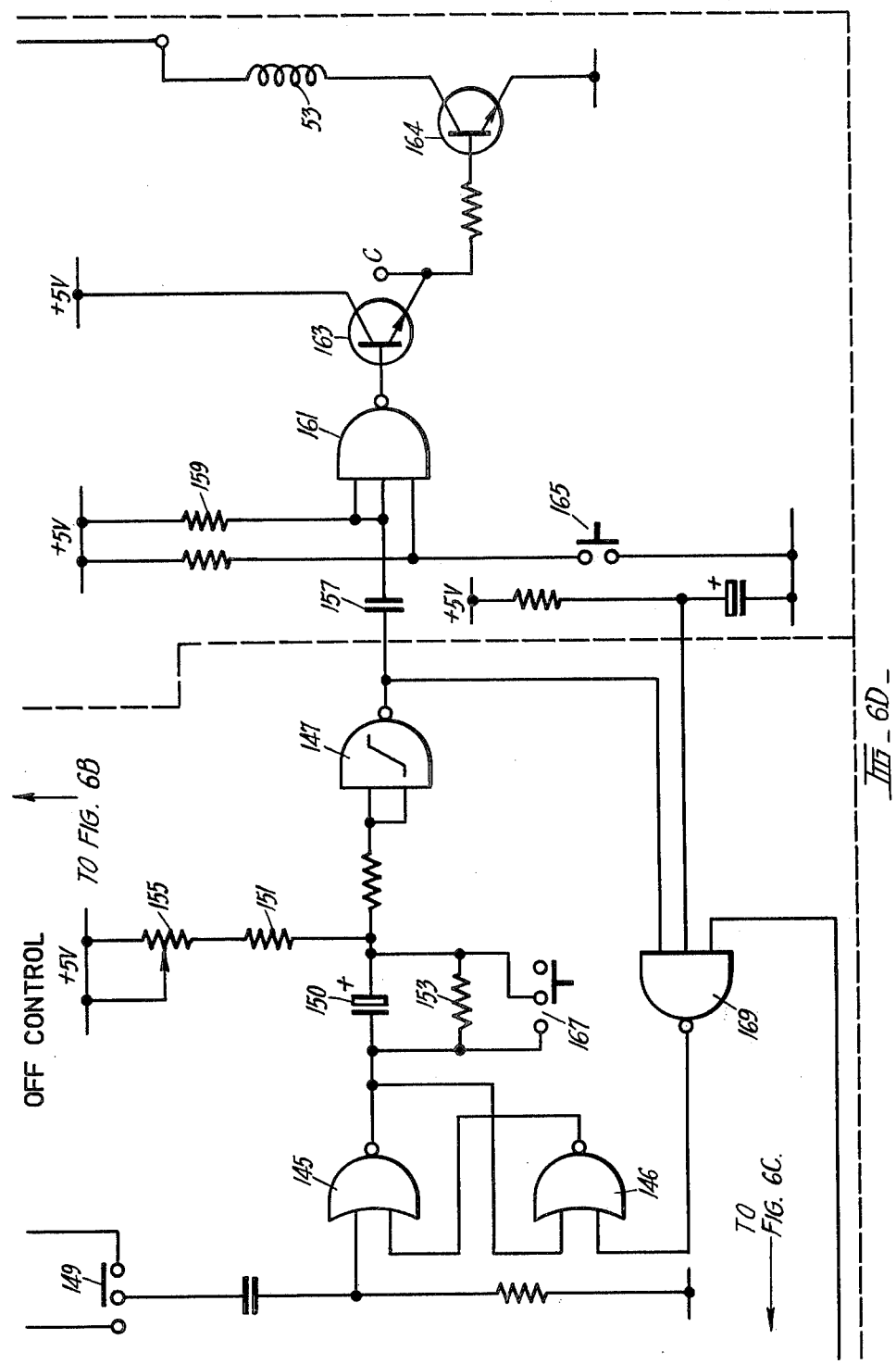

WATERING VALVE DEVICE

BACKGROUND OF THE INVENTION

The present invention relates generally to a water flow control device and more particularly, to a watering valve device for automatically controlling the flow of water for water sprinklers or irrigation pipes.

Some systems known and used hitherto for controlling water in a pipeline or hose for watering lawns or for irrigation purposes involve a valve controlled by a timer. Often these timers are either mechanically or electrically operated and switch on the valve at a predetermined time and for a predetermined time interval. A disadvantage of this type of system is that it does not, as a rule, take into consideration the moisture content of the ground to be watered. Thus these systems may cause water to be turned on even though rain may be falling or the ground already sufficiently moist.

Other known systems include moisture probes but such systems are de-activated upon a predetermined moisture content being detected. Another known device incorporates a light sensor and photocell for limiting watering substantially to night-time. However such a device is obviously susceptible to such spurious influences as small children actuating the valve by placing their hands over the photocell.

Accordingly it is an object of the present invention to provide a valve device which reduces water wastage and allows water to flow only when required.

A further object of the invention is to enable more effective watering of lawns or land by allowing the water to flow at night and/or at other times of relatively low evaporation rate.

SUMMARY OF THE INVENTION

According to one aspect of the present invention there is provided a water flow control device including an on-off valve, a moisture probe for detecting the moisture content of the ground to be watered and circuit means associated with said moisture probe, said moisture probe being adapted to actuate a first timing means for a predetermined time after said moisture probe has reached a predetermined moisture content, and thereupon to close said valve.

A further aspect of the invention provides a water flow control device including an on-off valve, a light sensor responsive to the presence or absence of sunlight and a timing means actuable by said light sensor to actuate said valve a predetermined time after the absence of sunlight has been detected.

The valve device may be a bistable valve electronically pulsed by the discharge of a storage capacitor and the electrical power required may be derived from cells which may be rechargeable e.g. by sun or wind energy harnessed in a manner known per se.

BRIEF DESCRIPTION OF THE DRAWINGS

In order that the invention may be better understood and more readily put into practical effect there will now be described with reference to the accompanying illustrative drawings a preferred embodiment of a water flow control device according to the present invention in which:

FIG. 1 is a perspective view of a watering valve device according to the present invention;

FIG. 2 is a cross-sectional view across line 2—2 of FIG. 1;

FIG. 3 is a cross-sectional view across line 3—3 of FIG. 2 showing the valve in its off or closed position;

FIG. 4 is the same view as that shown in FIG. 3 with the valve in its on or open position;

FIG. 5 is a block diagram showing the components of the device illustrated in FIGS. 1 to 4; and FIGS. 6A–6D are complementary parts of a diagram of a practical embodiment of circuit for the operation of the water flow control device illustrated in FIGS. 1 to 5.

DETAILED DESCRIPTION OF A PREFERRED EMBODIMENT

Figure 6A:
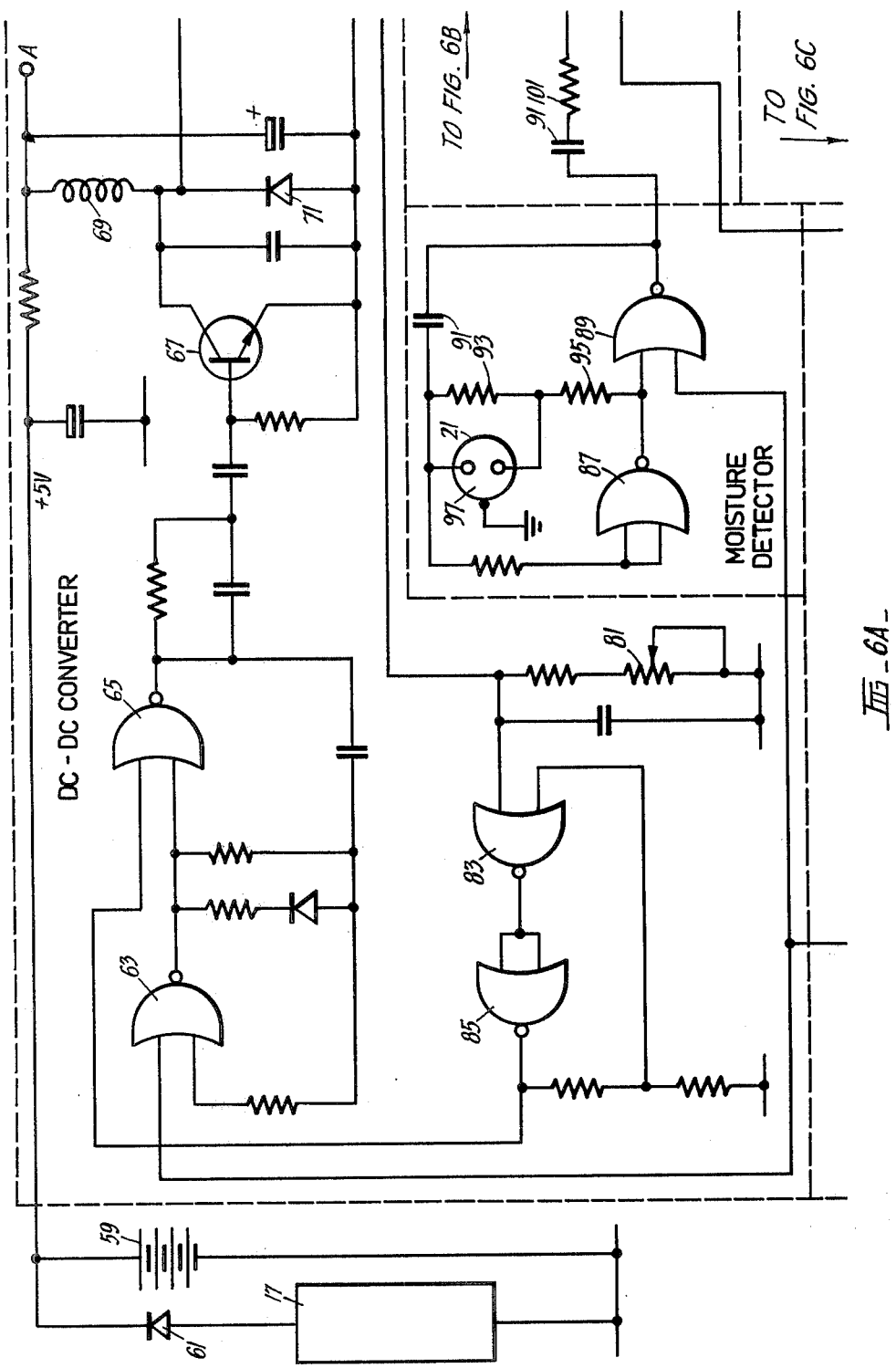

Referring to FIGS. 1 and 2, the water control device 1 has an inlet pipe 3 and outlet pipe 5. The device has a lid 7 containing electronic circuitry and a bottom portion 9 containing a bistable valve 11, both portions being pivotally connected together by hinge 13. A window 15 is adapted to protect and expose the sun's radiation a plurality of solar cells 17. The top portion 7 may be fully sealed to prevent ingress of dirt and moisture. A printed circuit board 19 inside lid 7 is adapted to control the operation of the device. A moisture probe 21 for spiking in the soil for determination of the soil's moisture content may be connected to printed circuit board 19 by a cable 23.

The bistable valve 11 is described in more detail with reference to FIGS. 2, 3 and 4. The valve has an inlet 25 and outlet 27 with the flow of water therethrough being controlled by a diaphragm valve 29 the outer periphery of which is sandwiched between an upper part 31 and a lower part 33. The diaphragm valve has a strengthening member 35 located in the middle thereof and actuable by a steel plunger 37 in bore 39 and biassed by spring 41. At least one aperture 43 in diaphragm valve 29 and strengthening member 35 allows equilization of water pressure on either side of the diaphragm valve. Rubber tip 45 on plunger 37 acts as a shock absorber if the plunger should hit the end piece 47 while tip 46 acts as a seal. A magnet 49 with pole 51 will act upon steel plunger 37 through end piece 47. The lower part 33 includes two concentric coils 53 and 55 which are respectively the "off" coil and the "on" coil.

The closed position of the valve is shown in FIG. 3 where the diaphragm valve 29 closes off the outlet 27 by seating on valve seat 57. Water may flow from the inlet 25 through aperture 43 to equalize the pressures on either side of the diaphragm valve. Upon receipt of an "on" pulse from printed circuit board 19 the "on" coil is activated to cause the steel plunger 37 holding the diaphragm valve 29 closed to move downwardly. The spring 41 encourages the downward movement due to the attraction of magnet 49. The diaphragm valve will move off valve seat 57 to allow water to flow from inlet 25 through outlet 27a as shown in FIG. 4. The attraction of plunger 37 to magnet 49 will avoid continued activation of "on" coil 55. To close the valve an "off" pulse is provided from circuit board 19 which activates the "off" coil 53. The steel plunger 37 moves upwardly with the assistance of spring 41 to seat diaphragm valve 29 on valve seat 57.

FIG. 5 is a block diagram of the water control device. The individual blocks shown in FIG. 5 are more precisely illustrated in FIGS. 6A to 6D.

FIG. 6A shows a part of the DC-DC CONVERTER, the MOISTURE DETECTOR, the

SOLAR PANEL CHARGE CONTROL & PROTECTION and CHARGABLE BATTERIES shown in FIG. 5.

The SOLAR PANEL consists of a plurality of solar cells 17 which recharge the CHARGABLE BATTERIES 59 which are typically four (4) "AA" size NiCd batteries. The CHARGE CONTROL & PROTECTION comprises a diode 61 which isolates the solar cells 17 from batteries 59 and prevents a reverse bias damage to the cells 17.

As the voltage derived from the batteries is typically 5 V, a DC-DC CONVERTER may be used to increase this voltage to about 30 V to enable the "off" and "on" coils 53, 55 (shown in FIGS. 6B and 6D) to be actuated. The DC-DC converter circuit is commonly called a fly-back converter. Two CMOS NOR gates 63, 65 may be coupled together to form an oscillator which drives switching transistor 67. The transistor 67 pulses current through an RFC choke 69 to develop an emf greater than the 30 V peak across the choke 69 when the switching transistor opens circuit. The resulting emf is rectified by diodes 71 and 73, smoothed by capacitor 75 and charges a 1000 $\mu$F 35 V capacitor 77. The capacitor 77 may be charged to 30 V so as, when switched, to enable coils 53, 55 to be actuated. When the capacitor 77 is fully charged, the oscillator formed by NOR gates 63, 65 is turned off by feeding back a sample of the voltage output through resistors 79. The feedback signal may be controlled by potentiometer 81 and coupled NOR gates 83, 85. The 30 V level for capacitor 77 may be set by potentiometer 81 and the oscillator formed by NOR gates 63, 65 will be tripped off when the capacitor is charged. Thus the DC-DC converter is only operational when capacitor 77 loses its charge.

The MOISTURE DETECTOR may be a low frequency oscillator comprising two CMOS NOR gates 87, 89. The frequency of this oscillator is usually dependant on the time constant due to the capacitor 91 and resistances 93, 95 and 97. Resistance 97 is the dominant resistance and is the soil resistance (conductivity) measured by probe 21. As the soil dries out, the resistance of the soil increases and therefore the frequency of oscillation decreases. Typically, a wet condition would cause the oscillator to operate at about 50 Hz whilst a dry condition would operate at about 10 Hz. The signal from the oscillator may be fed to a high-pass filter network formed by capacitor 99 and resistor 101.

FIG. 6B shows a part of the DC-DC CONVERTER (already described), the ON CONTROL for the valve and a part of the VALVE CONTROL. The signal from the high-pass filter network 99, 101 is fed to a detector circuit which rectifies and smoothes the signal due to diodes 103, 105; resistor 107 and capacitor 109. The detector circuit is coupled to an input of a CMOS NAND Schmitt trigger 111 which will generate a sharp transition to trigger the "on" coil 55 of the bistable valve 11. The "on" output from Schmitt trigger 11 may be differentiated into a short pulse by capacitor 113 and resistor 115. The signal may then be fed to NAND gate 117 and amplified by the transistor arrangement 119, 121. Transistor 121 discharges the capacitor 77 rapidly through the "on" coil 55. This pulse will shift the diaphragm valve 29 from a closed to an open position. The "on" coil 55 may also be activated by depressing the "manual on" switch 123.

FIG. 6C shows the NIGHT DETECTOR & ON DELAY. A phototransistor 125 (e.g. BPX 70) is used as a light sensor to differentiate between night and day. The phototransistor is coupled to an input of a CMOS NAND Schmitt trigger 126 whilst the other input is coupled to a two position switch 127. In the position illustrated, the switch is set for day and night watering whilst the other position only allows night time watering. The output from trigger 126 may be used to start a monostable oscillator consisting of a NAND gate 129 for inverting the signal to a capacitor 131, resistors 133, 135 and potentiometer 137 for a variable night watering delay. The delay is typically from about 1 minute to about 3½ hours. The output from this delay network is fed to a CMOS NAND Schmitt trigger 139 to clean up the transition from high to low. This transition is capacitively coupled by capacitor 141 into the time delay cross coupled NAND gates 143, 144 which hold the high signal until they are reset at sunrise.

FIG. 6D shows the OFF CONTROL and the other half of the VALVE CONTROL. A watering timer is formed by NOR gates 145, 146. The watering timer is selectable between two positions by switch 149. In the switch position shown the watering timer acts independently of the moisture probe 21. The watering time is triggered on by a positive transition obtained from NAND gate 117. In the other switch position the watering timer acts for its predetermined time on receipt of a "sufficient moisture" signal from Schmitt trigger 111. The actual timing is performed in a manner very similar to that shown in FIG. 6C of the ON DELAY. The two cross-coupled NOR gates 145, 146 act as a memory and capacitor 150, resistors 151, 153 and potentiometer 155 control the duration of the watering time. The output of the timing circuit is fed to a CMOS NAND Schmitt trigger 147 for a clean "off" transition. The "off" output from Schmitt trigger 147 is differentiated into a short pulse by capacitor 157 and resistor 159. The signal is then fed to NAND gate 161 and amplified by the transistor arrangement 163, 164. Transistor 164 discharges the capacitor 77 rapidly through the "off" coil 53. This pulse will shift the diaphragm valve 29 from an open position to a closed position. The "off" coil may also be activated by depressing the "manual off" switch 165. For the timing circuit to operate switch 167 must be set in the position shown. Altering the position of switch 167 shorts out the timing capacitor 150. This switch position is used for the watering valve device to operate from sunset to sunrise by a flip-flop set-reset latch in the form of a NAND gate 169. The set-reset latch 169 is set by a pulse from NAND gate 117 and reset when a pulse is introduced into the reset input through a differentiating circuit comprising capacitor 171 and resistor 173 which is connected to the output of Schmitt trigger 126.

The watering valve device has five main modes of operation which are:

| (i) | switch | position |
|---|---|---|
|  | 127 | as shown |
|  | 149 | as shown |
|  | 167 | as shown |

With the switches in the above positions watering is carried out at any time. The moisture probe 21 will activate the "on" coil 55 when insufficient moisture has been detected. The watering will continue for a period determined by the OFF TIMER which will activate the "off" coil 53 after completion of its timing period.

| (ii) | switch | position |
|---|---|---|
| | 127 | other position |
| | 149 | as shown |
| | 167 | as shown |

In these switch positions the device can only be switched on at night. During the day the DC-DC CONVERTER and MOISTURE DETECTOR are inhibited from working because of the signal from NAND gate 129. The "on" coil will be activated by the detection of insufficient moisture by moisture probe 21 but the activation of the "on" coil will be delayed by a timing period set by the NIGHT DELAY TIMER. The watering will continue for a period determined by the OFF TIMER which will activate the "off" coil 53 after completion of its timing period.

| (iii) | switch | position |
|---|---|---|
| | 127 | as shown |
| | 149 | other position |
| | 167 | as shown |

The activation of the "on" coil 55 is as in (i) but the activation of the "off" coil is controlled by the moisture probe 21. The water will continue until the probe has detected sufficient moisture wherein the OFF TIMER will be activated to determine a timing period before activation of the "off" coil 53.

| (iv) | switch | position |
|---|---|---|
| | 127 | other position |
| | 149 | other position |
| | 167 | as shown |

Watering is only allowed at night. The valve 11 will be switched on as in (ii) and switched off as in (iii).

| (v) | switch | position |
|---|---|---|
| | 127 | other position |
| | 149 | as shown |
| | 167 | other position |

These switch positions are used for long periods of watering e.g. for slow deep penetration of water through soaker hoses. The valve 11 will be switched on as in (ii) and will turn off at sunrise when phototransistor conducts.

As previously described, the valve may be manually turned on and off through switches 123, 165. Furthermore the valve may be switched on and off by remote control. To switch on the valve a switchable lead between point A (FIG. 6A) and point B (FIG. 6B) will enable transistor 121 to conduct to activate "on" coil 55. To switch off the valve a switchable lead between point A and point C (FIG. 6D) will enable transistor 164 to conduct.

For frost-prone areas a temperature sensor e.g. a thermistor may be included in the circuit to prevent watering below a predetermined temperature.

It will be evident from the foregoing that the gates included in the circuit could easily be replaced by a microprocessor with a small amount of ROM and "scratchpad" RAM. The DC-DC converter may become redundant when a high voltage controller is available.

We claim:

1. A water flow control device including an on-off valve, a moisture probe for detecting the moisture content of ground to be watered, and circuit means responsive to said moisture probe, said moisture probe being adapted to actuate a first timing means of said circuit means for a first predetermined time after said moisture probe has reached a predetermined moisture content, and thereupon to close said valve.

2. A water flow control device including an on-off valve, a light sensor responsive to the presence or absence of sunlight, a timing means actuable by said light sensor to actuate said valve a first predetermined time after the absence of sunlight has been detected and a moisture probe adapted to actuate a further timing means for a second predetermined time after said moisture probe has reached a predetermined moisture content, and thereupon to close said valve.

3. A device as claimed in any one of claims 1 or 2 wherein said valve comprises a bistable solenoid valve adapted to be switched to an "on" position by a first pulse and to an "off" position by a second pulse.

4. A device as claimed in claim 3 wherein the device is adapted to be powered by solar-rechargeable batteries.

5. A device as claimed in claim 4 including a DC-DC converter for increasing the voltage supplied by the batteries, the increased voltage being adapted to charge a capacitor for providing said first or second pulses.

6. A device as claimed in claim 1 wherein said first timing means is switchable to a further position wherein said first timing means is actuable for the predetermined time after said moisture probe has detected insufficient moisture content in the ground.

7. A device as claimed in claim 1 further including a light sensor responsive to the presence or absence of sunlight and a second timing means of said circuit means actuable by said light sensor to actuate said valve a second predetermined time after the absence of sunlight has been detected, said device being switchable to a position to by-pass said moisture probe and said valve being actuable for the first predetermined time set by said first timing means.

8. A device as claimed in claim 7 wherein said device is switchable to a position where said first timing means is by-passed and said valve is adapted to be activated and de-activated by said light sensor.

* * * * *